United States Patent
Yari et al.

(10) Patent No.: US 6,654,203 B2
(45) Date of Patent: Nov. 25, 2003

(54) THIN-FILM MAGNETIC HEAD AND METHOD OF MANUFACTURING SAME, HEAD GIMBAL ASSEMBLY AND HARD DISK DRIVE

(75) Inventors: Seiji Yari, Tokyo (JP); Atsushi Yamaguchi, Tokyo (JP); Tetsuya Mino, Tokyo (JP); Kazuo Ishizaki, Tokyo (JP); Jun-ichi Hokushin, Tokyo (JP); Junichi Sato, Tokyo (JP); Kazuya Maekawa, Tokyo (JP)

(73) Assignee: TDK Corporation, Tokyo (JP)

( * ) Notice: Subject to any disclaimer, the term of this patent is extended or adjusted under 35 U.S.C. 154(b) by 134 days.

(21) Appl. No.: 09/930,286

(22) Filed: Aug. 16, 2001

(65) Prior Publication Data
US 2002/0186504 A1 Dec. 12, 2002

(30) Foreign Application Priority Data
Apr. 25, 2001 (JP) ........................ 2001-128487

(51) Int. Cl.$^7$ .............................................. G11B 5/147
(52) U.S. Cl. ....................................................... 360/126
(58) Field of Search .......................................... 360/126

(56) References Cited

U.S. PATENT DOCUMENTS

| | | | |
|---|---|---|---|
| 4,814,921 A | * | 3/1989 | Hamakawa et al. ........ 360/126 |
| 5,438,747 A | | 8/1995 | Krounbi et al. |
| 6,233,116 B1 | * | 5/2001 | Chen et al. ................. 360/126 |
| 6,404,601 B1 | * | 6/2002 | Rottmayer et al. ......... 360/317 |

FOREIGN PATENT DOCUMENTS

| | | |
|---|---|---|
| JP | A 5-73839 | 3/1993 |
| JP | A 7-262519 | 10/1995 |
| JP | A 10-3613 | 1/1998 |
| JP | A 11-175915 | 7/1999 |
| JP | A 2001-134907 | 5/2001 |

\* cited by examiner

*Primary Examiner*—Robert S. Tupper
(74) *Attorney, Agent, or Firm*—Oliff & Berridge, PLC

(57) ABSTRACT

In a method of forming a track width defining layer including a magnetic pole portion, a base film is initially formed on a write gap layer. The base film includes a first layer made of a magnetic material having a saturation magnetic flux density of 1.8 T or more, and a second layer formed on the first layer and made of a magnetic material. The magnetic material forming the second layer is a material containing Fe or Ni as a main component and without containing Co. Then, a frame having an opening of a shape matching with the track width defining layer is formed on the second layer. Subsequently, the track width defining layer is formed within the opening by electroplating, using the base film as an electrode.

8 Claims, 11 Drawing Sheets

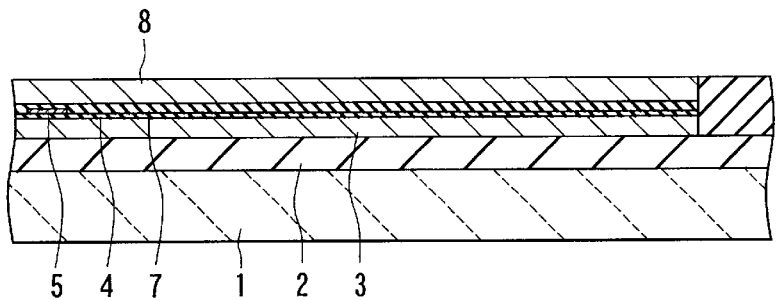 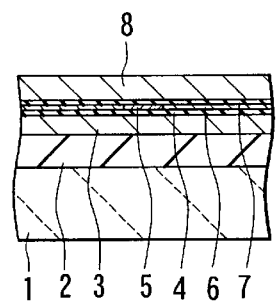
FIG. 1A  FIG. 1B
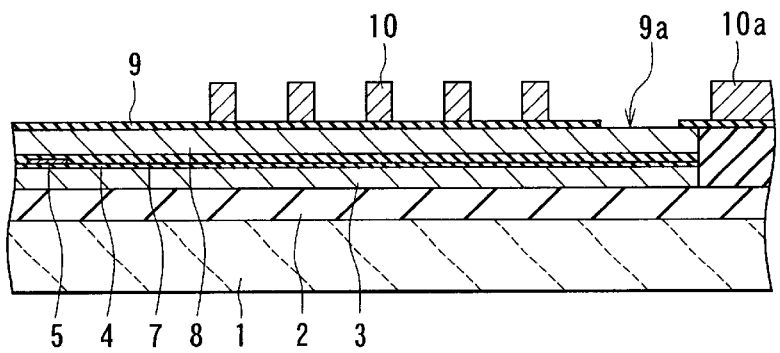 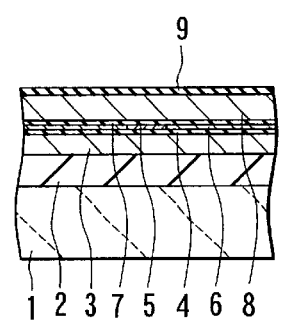
FIG. 2A  FIG. 2B

THIN-FILM MAGNETIC HEAD AND METHOD OF MANUFACTURING SAME, HEAD GIMBAL ASSEMBLY AND HARD DISK DRIVE

BACKGROUND OF THE INVENTION

1. Field of the Invention

The present invention relates to a thin-film magnetic head having at least an induction-type electromagnetic transducer and a method of manufacturing the same, and to a head gimbal assembly and a hard disk drive.

2. Description of the Related Art

Recently, performance improvements in thin-film magnetic heads have been sought as areal recording density of hard disk drives has increased. Such thin-film magnetic heads include composite thin-film magnetic heads that have been widely used. A composite thin-film magnetic head is made of a layered structure including a write (recording) head having an induction-type electromagnetic transducer for writing and a read (reproducing) head having a magnetoresistive (MR) element for reading.

The write head has a bottom pole layer and a top pole layer each of which has a magnetic pole portion. The magnetic pole portions of the bottom and top pole layers are located on a side of the air bearing surface and opposed to each other. The write head further has a write gap layer provided between the magnetic pole portions of the bottom and top pole layers, and a thin-film coil provided such that at least a part of the coil is insulated from the bottom and top pole layers.

What is required of the write head for achieving a high recording density is, in particular, reduction in a magnetic pole width that defines a write track width and improvement in recording characteristics. For example, in order to achieve a thin-film magnetic head having an areal recording density exceeding 30 gigabits per square inch, a magnetic pole width of 0.4 μm or less is required. On the other hand, when the pole width is reduced, the recording characteristics, one of which is overwrite property that is a parameter indicating one of characteristics when data is overwritten, deteriorate. Hence, the more the pole width is reduced, the more the recording characteristics need to be improved.

Conventionally, NiFe (Permalloy) is often used as a material of the magnetic pole. However, in order to achieve the recording characteristics that meet the need for a high recording density as discussed above, high saturation magnetic flux density materials having a higher saturation magnetic flux density than that of NiFe, for example, those having a saturation magnetic flux density of 1.8 T or higher, have been used recently as a material of the magnetic pole. Among such high saturation magnetic flux density materials, magnetic materials including FeCo or CoNiFe are often used.

As disclosed in Published Unexamined Japanese Patent Application (KOKAI) No. Hei 7-262519, for example, frame plating is used as a method of forming the magnetic pole that defines the write track width. In the frame plating, a base film that will serve as an electrode for plating is formed on a base by sputtering, for example, and a photoresist layer is formed on the base film. The photoresist layer is then patterned through a photolithography process, thereby forming a frame to be used for plating. The frame has an opening in the portion where the magnetic pole is to be formed. Using this frame, electroplating is performed with the previously formed base film as an electrode. A plating layer that will be made into the magnetic pole is thereby formed on the base film. Subsequently, the frame is removed, and unwanted portions of the base film that are other than the portion present under the plating layer are removed by dry etching such as ion milling. Thus, the base film remains under the magnetic pole formed in the above manner.

Conventionally, when NiFe is used as the material of the magnetic pole, NiFe is also used for the base film. The saturation magnetic flux density of NiFe is approximately 0.9 to 1.4 T. Accordingly, when a high saturation magnetic flux density material is intended to be used as the material of the magnetic pole to improve the recording characteristics as discussed above, a high saturation magnetic flux density material having a saturation magnetic flux density of, for example, 1.8 T or higher, is required for the base film, too. Like in the case of the magnetic pole, a high saturation magnetic flux density material used for the base film may be, for example, a magnetic material including FeCo or CoNiFe.

Published Unexamined Japanese Patent Application (KOKAI) No. Hei 5-73839 discloses a technique of forming a base film from a material having a saturation magnetic flux density higher than that of the magnetic pole.

It has been found, however, that there arise various problems as discussed below when a high saturation magnetic flux density material containing Co is used as the material of the base film.

A first problem is that, when forming the frame by patterning the photoresist layer formed on the base film through the photolithography process, a part of the photoresist that should be removed often adheres to the base film and remains thereon within the opening of the frame. If the unwanted part of the photoresist remains on the base film within the opening of the frame, a magnetic pole cannot be formed into a desired shape. Increasing a quantity of exposure onto the photoresist layer during the photolithography process can prevent the unwanted part of the photoresist from remaining on the base film. However, this enlarges the opening of the frame, thereby making it difficult to reduce the pole width.

A second problem is that a high saturation magnetic flux density material including Co has poor resistance to corrosion compared with NiFe, and for this reason, the base film is subject to corrosion before the magnetic pole is formed by frame plating. For example, in the plating process, during the period from the time when the base film is brought into contact with a plating liquid to the time when application of a predetermined voltage to the base film is started, the base film is subject to etching by a plating liquid and damaged by corrosion. When the base film is thus damaged by corrosion, a magnetic pole cannot be formed into a desired shape, either.

Corrosion on the base film before formation of the magnetic pole also occurs in the case of forming the frame for plating from a multi-layer film having three or more layers. A technique of forming the frame for plating from a multi-layer film having three or more layers is disclosed in, for example, Published Unexamined Japanese Patent Application (KOKAI) Nos. Hei 10-3613 and 11-175915. Here, a method of forming the frame for plating from a three-layer film will be briefly described. According to the method, a three-layer film is first formed. The uppermost layer of this film is a relatively thin photoresist layer; the layer beneath the same is the intermediate layer made of metal, ceramic, etc.; and the lowermost layer is a photoresist layer. According to this method, the photoresist layer provided as the uppermost layer is patterned by photolithography. Then, using the patterned photoresist as a mask, the intermediate layer is patterned by reactive ion etching. Subsequently, using the patterned intermediate layer as a mask, the photoresist layer provided as the lowermost layer is patterned by reactive ion etching.

The above method makes it possible to form a frame for plating having a narrow opening. In this method, however, if a high saturation magnetic flux density material containing Co is used for the base film, the base film is subject to etching by a reactive gas and damaged by corrosion when the lowermost photoresist layer is patterned by reactive ion etching.

Published Unexamined Japanese Patent Application (KOKAI) No. Hei 5-73839 discloses that, when a Co—Zr—Ta amorphous film is used as the base film and an NiFe plating layer is used as the magnetic pole, the base film and the plating layer react with each other and it is therefore necessary to provide a thin film (having a thickness of approximately 0.1 $\mu$m) of metal such as Ti and Cr between the base film and the plating layer. However, it is not preferable to provide a film of a non-magnetic metal such as Ti and Cr between the base film and the plating player, because it may cause deterioration of the recording characteristics.

OBJECT AND SUMMARY OF THE INVENTION

It is an object of the present invention to provide a thin-film magnetic head and a method of manufacturing the same, a head gimbal assembly and a hard disk drive which allow a magnetic pole to be formed into a desired shape, while using a high saturation magnetic flux density material as the material of a base film that is to be a base of a magnetic pole formed by frame plating so as to meet the demand for a high recording density.

A thin-film magnetic head of the invention comprises: a medium facing surface that faces toward a recording medium; a first magnetic layer and a second magnetic layer magnetically coupled to each other and including magnetic pole portions that are opposed to each other and placed in regions of the magnetic layers on a side of the medium facing surface, each of the magnetic layers including at least one layer; a gap layer provided between the magnetic pole portions of the first and second magnetic layers; and a thin-film coil at least a part of which is placed between the first and second magnetic layers and insulated from the first and second magnetic layers. At least one of the first and second magnetic layers includes a conductive base film and a layer including the magnetic pole portion. The base film includes a first layer made of a magnetic material having a saturation magnetic flux density of 1.8 T or more, and a second layer provided between the first layer and the layer including the magnetic pole portion and made of a magnetic material different from the material of the first layer.

According to the thin-film magnetic head of the present invention, the base film in at least one of the first and second magnetic layers includes the first layer made of a magnetic material having a saturation magnetic flux density of 1.8 T or more, and the second layer provided between the first layer and the layer including the magnetic pole portion and made of a magnetic material different from the material of the first layer. Hence, the first layer made of a high saturation magnetic flux density material having a saturation magnetic flux density of 1.8 T or more is covered with the second layer, so that the first layer is neither brought into contact with resist nor susceptible to etching by a plating liquid or a reactive gas.

In the thin-film magnetic head of the invention, the magnetic material of which the second layer is made may be a magnetic material that contains Fe or Ni as a main component and does not contain Co.

In the thin-film magnetic head of the invention, the magnetic material of which the second layer is made may have better resistance to corrosion by a plating liquid used in forming the layer including the magnetic pole portion by plating than that of the magnetic material of which the first layer is made.

In the thin-film magnetic head of the invention, the magnetic material of which the second layer is made may have better resistance to corrosion by a reactive gas used in patterning a frame for forming the layer including the magnetic pole portion by reactive ion etching than that of the magnetic material of which the first layer is made.

In the thin-film magnetic head of the invention, the second layer may have a thickness of 14 nm or less.

In the thin-film magnetic head of the invention, the magnetic material of which the first layer is made may be a magnetic material containing Co.

The present invention provides a method of manufacturing a thin-film magnetic head comprising: a medium facing surface that faces toward a recording medium; a first magnetic layer and a second magnetic layer magnetically coupled to each other and including magnetic pole portions that are opposed to each other and placed in regions of the magnetic layers on a side of the medium facing surface, each of the magnetic layers including at least one layer; a gap layer provided between the magnetic pole portions of the first and second magnetic layers; and a thin-film coil at least a part of which is placed between the first and second magnetic layers and insulated from the first and second magnetic layers. The method comprises the steps of: forming the first magnetic layer; forming the gap layer on the first magnetic layer; forming the second magnetic layer on the gap layer; and forming the thin-film coil, wherein: the second magnetic layer has a layer including the magnetic pole portion formed by plating, and the step of forming the second magnetic layer includes the steps of: forming a conductive base film that is used when forming the layer including the magnetic pole portion by plating and is to be a base of the layer including the magnetic pole portion; forming a frame having an opening of a shape matching with the layer including the magnetic pole portion on the base film; and forming the layer including the magnetic pole portion within the opening of the frame by plating. The base film includes a first layer made of a magnetic material having a saturation magnetic flux density of 1.8 T or more, and a second layer provided between the first layer and the layer including the magnetic pole portion and made of a magnetic material different from the material of the first layer.

According to the method of manufacturing a thin-film magnetic head of the invention, the base film that is to be a base of the layer including the magnetic pole portion includes the first layer made of a magnetic material having a saturation magnetic flux density of 1.8 T or more, and the second layer provided between the first layer and the layer including the magnetic pole portion and made of a magnetic material different from the material of the first layer. Hence, the first layer made of a high saturation magnetic flux density material having a saturation magnetic flux density of 1.8 T or more is covered with the second layer, so that the first layer is neither brought into contact with resist nor susceptible to etching by a plating liquid or a reactive gas.

In the method of manufacturing a thin-film magnetic head of the invention, the magnetic material of which the second layer is made may be a magnetic material that contains Fe or Ni as a main component and does not contain Co.

In the method of manufacturing a thin-film magnetic head of the invention, the magnetic material of which the second layer is made may have better resistance to corrosion by a plating liquid used in forming the layer including the magnetic pole portion by plating than that of the magnetic material of which the first layer is made.

In the method of manufacturing a thin-film magnetic head of the invention, the step of forming the frame may use reactive ion etching for patterning the frame; and the magnetic material of which the second layer is made may have better resistance to corrosion by a reactive gas used in the reactive ion etching than that of the magnetic material of which the first layer is made.

In the method of manufacturing a thin-film magnetic head of the invention, the second layer may have a thickness of 14 nm or less.

In the method of manufacturing a thin-film magnetic head of the invention, the magnetic material of which the first layer is made may be a magnetic material containing Co.

A head gimbal assembly of the invention comprises: a slider that includes a thin-film magnetic head and is located to face toward a recording medium; and a suspension that flexibly supports the slider. A hard disk drive of the invention comprises: a slider that includes a thin-film magnetic head and is located to face toward a circular-plate-shaped recording medium that is rotated and driven; and an alignment device that supports the slider and aligns the slider with respect to the medium.

In the head gimbal assembly or the hard disk drive of the invention, the thin-film magnetic head comprises: a medium facing surface that faces toward a recording medium; a first magnetic layer and a second magnetic layer magnetically coupled to each other and including magnetic pole portions that are opposed to each other and placed in regions of the magnetic layers on a side of the medium facing surface, each of the magnetic layers including at least one layer; a gap layer provided between the magnetic pole portions of the first and second magnetic layers; and a thin-film coil at least a part of which is placed between the first and second magnetic layers and insulated from the first and second magnetic layers, wherein: at least one of the first and second magnetic layers includes a conductive base film and a layer including the magnetic pole portion; and the base film includes a first layer made of a magnetic material having a saturation magnetic flux density of 1.8 T or more, and a second layer provided between the first layer and the layer including the magnetic pole portion and made of a magnetic material different from the material of the first layer.

According to the head gimbal assembly or the hard disk drive of the invention, the base film in at least one of the first and second magnetic layers includes the first layer made of a magnetic material having a saturation magnetic flux density of 1.8 T or more, and the second layer provided between the first layer and the layer including the magnetic pole portion and made of a magnetic material different from the material of the first layer. Hence, the first layer made of a high saturation magnetic flux density material having a saturation magnetic flux density of 1.8 T or more is covered with the second layer, so that the first layer is neither brought into contact with resist nor susceptible to etching by a plating liquid or a reactive gas.

Other and further objects, features and advantages of the invention will appear more fully from the following description.

BRIEF DESCRIPTION OF THE DRAWINGS

FIGS. 1A and 1B are cross sections schematically illustrating a method of manufacturing a thin-film magnetic head according to an embodiment of the invention.

FIGS. 2A and 2B are cross sections for illustrating a step that follows FIGS. 1A and 1B.

DETAILED DESCRIPTION OF THE PREFERRED EMBODIMENTS

Figures 3A, 3B:
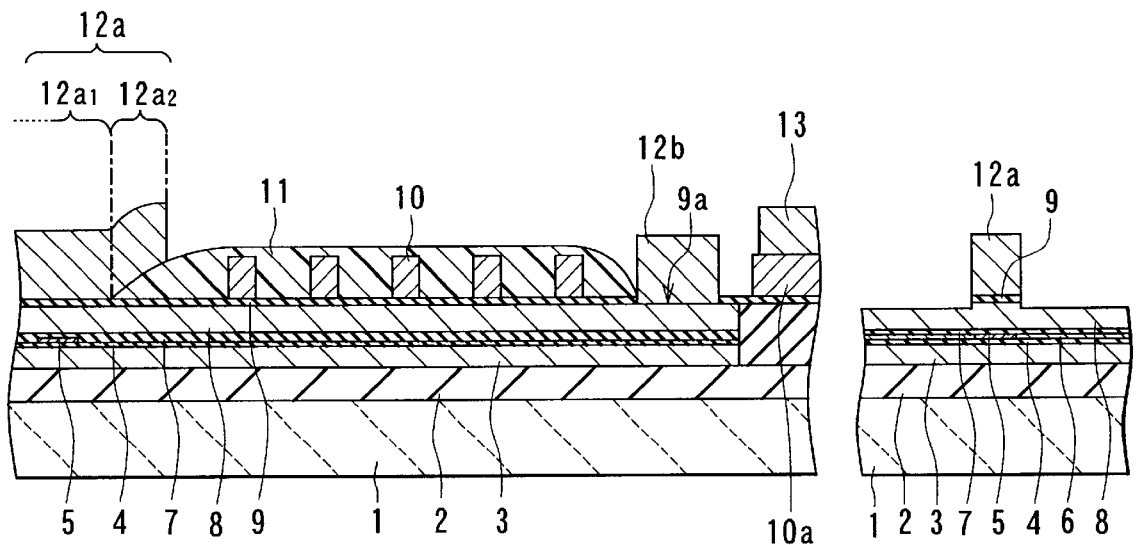
FIGS. 3A and 3B are cross sections for illustrating a step that follows FIGS. 2A and 2B.

Preferred embodiments of the invention will now be described in detail with reference to the accompanying drawings. Reference is now made to FIGS. 1A to 6A and to FIGS. 1B to 6B to describe a method of manufacturing a thin-film magnetic head of an embodiment of the invention. FIGS. 1A to 6A are cross sections orthogonal to an air bearing surface, and FIGS. 1B to 6B are cross sections of the magnetic pole portion each parallel to the air bearing surface.

In the method of manufacturing a thin-film magnetic head of the present embodiment, as shown in FIGS. 1A and 1B, an insulating layer 2 made of an insulating material such as alumina ($Al_2O_3$) is formed to a thickness of 1 to 5 μm, for example, by sputtering or the like on a substrate 1 made of a ceramic material such as aluminum oxide and titanium carbide ($Al_2O_3$—TiC). On the insulating layer 2, a bottom shield layer 3 made of a magnetic material such as Permalloy is formed to a thickness of about 3 μm, for example, by sputtering, plating or the like, for making a read head.

Next, on the bottom shield layer 3, a bottom shield gap film 4 made of an insulating material such as alumina is formed to a thickness of 10 to 200 nm, for example, by sputtering or the like. Next, on the bottom shield gap film 4, an MR element 5 for reading is formed to a thickness of tens of nanometers, for example, by sputtering or the like. The MR element 5 may be an element utilizing a magnetosensitive film exhibiting a magnetoresistivity, such as an AMR (anisotropic magnetoresistive) element, a GMR (giant magnetoresistive) element, or a TMR (tunnel magnetoresistive) element.

Next, on the bottom shield gap film 4, a pair of electrode layers 6 are formed to a thickness of tens of nanometers by sputtering or the like. The electrode layers 6 are electrically connected to the MR element 5. Next, on the bottom shield gap film 4 and the MR element 5, a top shield gap film 7 made of an insulating material such as alumina is formed to a thickness of 10 to 200 nm, for example, by sputtering or the like.

The above-described layers that make up the read head are patterned through a general etching method using a patterned resist, a liftoff method, or a combination thereof.

Next, on the top shield gap film 7, a top-shield-layer-cum-bottom-pole-layer (hereinafter called a bottom pole layer) 8 that is made of a magnetic material and used for both read head and write head is formed to a thickness of about 3 to 4 μm, for example. The magnetic material used for the bottom pole layer 8 is a soft magnetic material such as NiFe, CoFe, CoFeNi, and FeN. The bottom pole layer 8 is formed by sputtering or plating, for example.

In place of the bottom pole layer 8, there may be provided a top shield layer, a separation layer made of a non-magnetic material such as alumina formed on the top shield layer by sputtering or the like, and a bottom pole layer formed on the separation layer.

Next, as shown in FIG. 2A and FIG. 2B, a write gap layer 9 made of an insulating material such as alumina is formed on the bottom pole layer 8 to a thickness of 50 to 300 nm, for example, by sputtering or the like. Next, a portion of the gap layer 9 located in the center portion of a thin-film coil to be described later is etched to form a contact hole 9a for making a magnetic path.

Next, a first layer 10 of the thin-film coil made of copper (Cu), for example, is formed on the write gap layer 9 to a thickness of 2 to 3 μm, for example. In FIG. 2A, reference numeral 10a represents a connecting section of the first layer 10 for connection to a second layer 15 of the thin-film coil to be described later. The first layer 10 is wound around the contact hole 9a.

Next, as shown in FIGS. 3A and 3B, an insulating layer 11 is formed in a predetermined pattern to cover the first layer 10 of the thin-film coil and the write gap layer 9 around the same. The insulating layer 11 is made of an organic insulating material which exhibits fluidity when heated, such as photoresist. Next, heat treatment is performed at a predetermined temperature to flatten the surface of the insulating layer 11. As a result of the heat treatment, each of the outer and inner circumferential ends of the insulating layer 11 has a rounded and inclined surface configuration.

A track width defining layer 12a of a top pole layer 12 is formed from a magnetic material for making a write head on the write gap layer 9 and the insulating layer 11. The track width defining layer 12a is formed in a region ranging from an inclined portion of the insulating layer 11 on a side of an air bearing surface 20 (on the left side of FIG. 3A) to be described later to the air bearing surface 20. The top pole layer 12 is made up of the track width defining layer 12a, and a coupling portion layer 12b and a yoke portion layer 12c to be described later. As will be detailed later, the track width defining layer 12a is formed by plating.

The track width defining layer 12a has an end section $12a_1$ and a connecting section $12a_2$. The end section $12a_1$ is to be a magnetic pole portion of the top pole layer 12 and is formed on the write gap layer 9. The connecting section $12a_2$ is formed on the inclined portion of the insulating layer 11 on a side of the air bearing surface 20 and is connected to the yoke portion layer 12c. The width of the end section $12a_1$ is equal to the write track width. That is, the end section $12a_1$ defines the write track width.

When the track width defining layer 12a is formed, the coupling portion layer 12b made of a magnetic material is formed on the contact hole 9a, and a connecting layer 13 made of a magnetic material is formed on the connecting section 10a, at the same time. The coupling portion layer 12b constitutes a portion of the top pole layer 12 that is magnetically coupled to the bottom pole layer 8.

Next, the write gap layer 9 and at least a part of the magnetic pole portion of the bottom pole layer 8 located on the side of the write gap layer 9 are etched around the track width defining layer 12a, using the track width defining layer 12a as a mask. For example, reactive ion etching is used to etch the write gap layer 9, and ion milling is used to etch the bottom pole layer 8. The resultant structure as shown in FIG. 3B is called a trim structure, in which sidewalls of the magnetic pole portion of the top pole layer 12 (the end section $12a_1$ of the track width defining layer 12a), the write gap layer 9 and at least part of the magnetic pole portion of the bottom pole layer 8 are formed vertically in a self-aligned manner.

Figures 4A, 4B:
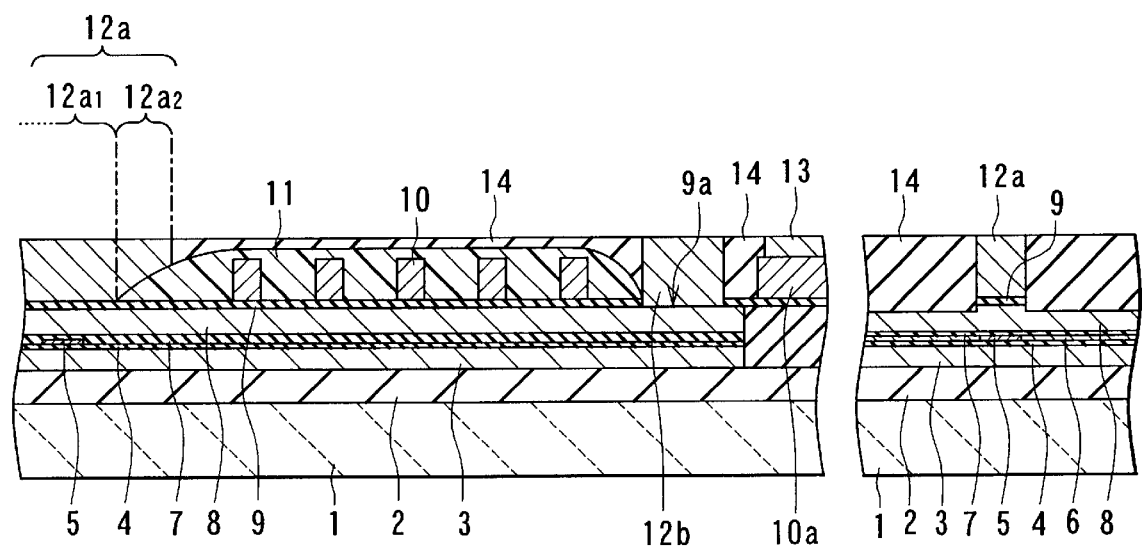
FIGS. 4A and 4B are cross sections for illustrating a step that follows FIGS. 3A and 3B.

Next, as shown in FIG. 4A and FIG. 4B, an insulating layer 14 made of an inorganic insulating material such as alumina is formed over the entire surface to a thickness of 3 to 4 μm, for example. Next, the insulating layer 14 is polished by chemical mechanical polishing (CMP), for example, such that the track width defining layer 12a, the coupling portion layer 12b and the connecting layer 13 are exposed, and the surface is flattened.

Figures 5A, 5B:
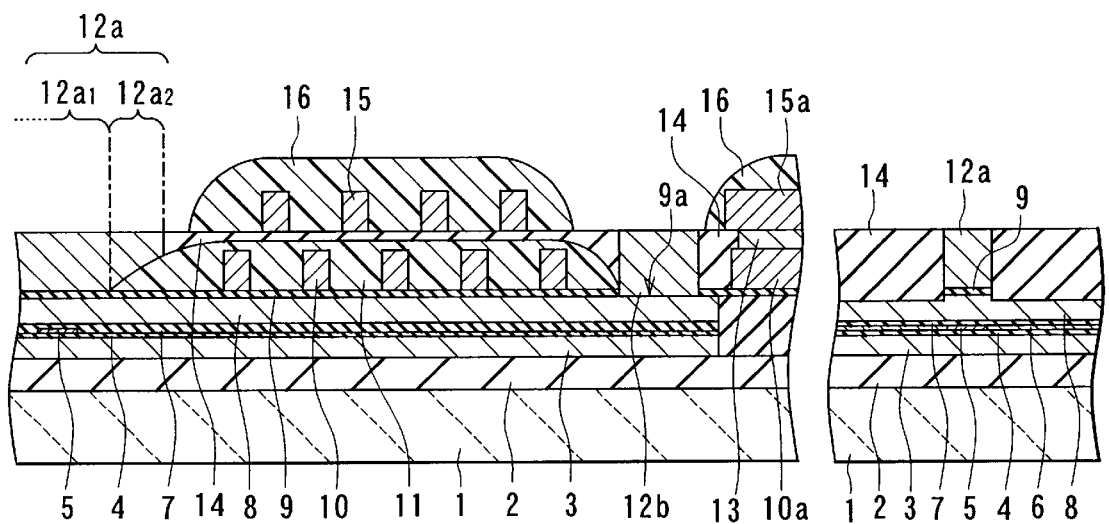
FIGS. 5A and 5B are cross sections for illustrating a step that follows FIGS. 4A and 4B.

Next, as shown in FIG. 5A and FIG. 5B, a second layer 15 of the thin-film coil made of copper (Cu), for example, is formed on the flattened insulating layer 14 to a thickness of 2 to 3 μm, for example. In FIG. 5A, reference numeral 15a represents a connecting section of the second layer 15 which is connected to the connecting section 1a of the first layer 10 of the coil through the connecting layer 13. The second layer 15 is wound around the coupling portion layer 12b.

Next, an insulating layer 16 is formed in a predetermined pattern so as to cover the second layer 15 of the thin-film coil and the insulating layer 14 around the same. The insulating layer 16 is made of an organic insulating material which exhibits fluidity when heated, such as photoresist. Next, heat treatment is performed at a predetermined temperature to flatten the surface of the insulating layer 16. As a result of the heat treatment, each of the inner and outer circumferential ends of the insulating layer 16 has a rounded and inclined surface configuration.

Figures 6A, 6B:
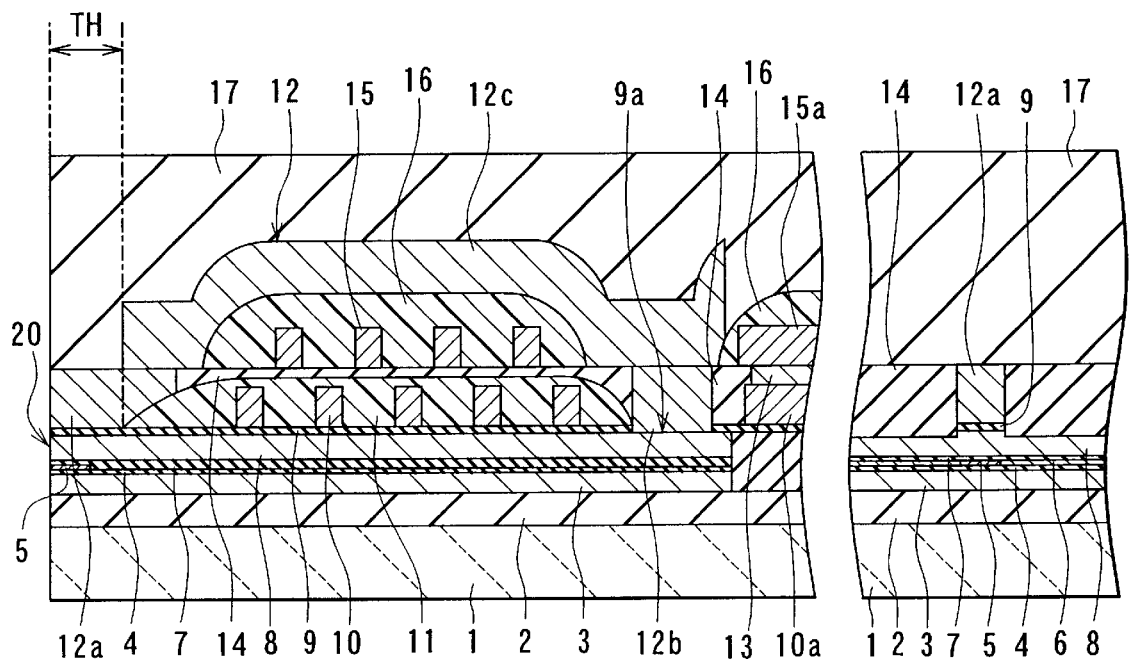
FIGS. 6A and 6B are cross sections for illustrating a step that follows FIGS. 5A and 5B.

Next, as shown in FIG. 6A and FIG. 6B, the yoke portion layer 12c constituting a yoke portion of the top pole layer 12 is formed from a magnetic material used for making the write head, such as Permalloy, on the track width defining layer 12a, the insulating layers 14 and 16 and the coupling portion layer 12b. An end of the yoke portion layer 12c facing the air bearing surface 20 is located away from the air bearing surface 20. The yoke portion layer 12c is connected to the bottom pole layer 8 through the coupling portion layer 12b.

Next, an overcoat layer 17 of alumina, for example, is formed to cover the entire surface. Finally, the slider having the above-described layers is mechanically processed to form the air bearing surface 20 of the thin-film magnetic head including the write head and the read head, thereby completing the thin-film magnetic head.

The thin-film magnetic head of the present embodiment produced as described above has a medium facing surface (air bearing surface 20) that faces toward a recording medium, and the read head and the write head (induction-type electromagnetic transducer). The read head has: the MR element 5; and the bottom shield layer 3 and the top shield layer (bottom pole layer 8) for shielding the MR element 5. Portions of the bottom shield layer 3 and the top shield layer located in a region on a side of the air bearing surface 20 are opposed to each other, the MR element 5 being placed between these portions.

The write head has the bottom pole layer 8 and the top pole layer 12 magnetically coupled to each other, each of which includes at least one layer. The bottom pole layer 8 and the top pole layer 12 include the magnetic pole portions that are opposed to each other and placed in regions on a side of the air bearing surface 20. The write head further has: the write gap layer 9 provided between the magnetic pole portion of the bottom pole layer 8 and the magnetic pole portion of the top pole layer 12; and the thin-film coil including the layers 10 and 15, at least part of the coil being disposed between the bottom pole layer 8 and the top pole layer 12 and insulated from the bottom pole layer 8 and the top pole layer. As shown in FIG. 6A, in the thin-film magnetic head of the present embodiment, the length from the air bearing surface 20 to the end of the insulating layer 11 closer to the air bearing surface 20 is a throat height TH. The throat height is the length (height) of portions of the two pole layers facing each other with the write gap layer in between, between the air-bearing-surface-side end and the other end.

In the present embodiment, the bottom pole layer 8 corresponds to the first magnetic layer of the invention, and the top pole layer 12 corresponds to the second magnetic layer of the invention. The track width defining layer 12a corresponds to the layer including the magnetic pole portion of the invention.

Figure 7:
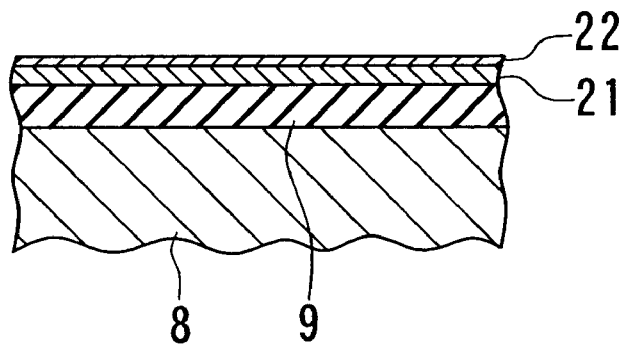
FIG. 7 is a cross section for illustrating a method of forming a track width defining layer of a top pole layer in the embodiment of the invention.

Next, a method of forming the track width defining layer 12a of the top pole layer 12 of the present embodiment will be described in detail with reference to FIGS. 7 through 14. According to this method of forming the track width defining layer 12a, as shown in FIG. 7, a conductive base film is initially formed on the write gap layer 9 by sputtering, for example. The conductive base film is used when forming the track width defining layer 12a by plating and is to be a base of the track width defining layer 12a.

The base film according to the present embodiment includes a first layer 21 made of a magnetic material having a saturation magnetic flux density of 1.8 T or more, and a second layer 22 formed on the first layer 21 and made of a magnetic material different from the material of the first layer 21. The base film may further include a bonding layer between the write gap layer 9 and the first layer 21 to increase adhesiveness of those layers to each other. For example, Ti is used as a material of the bonding layer. The bonding layer has a thickness of, for example, 4 to 6 nm.

For example, a magnetic material containing Co, such as a magnetic material including FeCo or CoNiFe, is used as the material of the first layer 21. It should be noted, however, that the magnetic material forming the first layer 21 may be a material that does not contain Co, such as FeN, as long as it has a saturation magnetic flux density of 1.8 T or more. The saturation magnetic flux densities of CoNiFe, FeN, and FeCoTaO which may be used as the magnetic material forming the first layer 21 are 1.8 T, 2.0 T, and 2.1 T, respectively. The first layer 21 preferably has a thickness of 50 to 250 nm.

A magnetic material that contains Fe or Ni as a main component and does not contain Co is used as the material of the second layer 22. Such a magnetic material has good peeling property with respect to photoresist, as compared with the high saturation magnetic flux density materials used for the first layer 21.

Also, the magnetic material used for the second layer 22 should have better resistance to corrosion by a plating liquid used in forming the track width defining layer 12a by plating than that of the magnetic material forming the first layer 21.

As will be described later, in the present embodiment a frame to be used in forming the track width defining layer 12a is patterned by using reactive ion etching. The magnetic material used for the second layer 22 should have better resistance to corrosion by a reactive gas used in the reactive ion etching than that of the material of the first layer 21.

Examples of the material of the second layer 22 satisfying all the above-specified requirements are NiFe (Ni: 80 wt %, Fe: 20 wt %) and NiFe (Ni: 50 wt %, Fe: 50 wt %). The saturation magnetic flux densities of these materials are 0.9 T and 1.5 T, respectively. As will be detailed later, the second layer preferably has a thickness of 8 to 14 nm.

Figure 8:
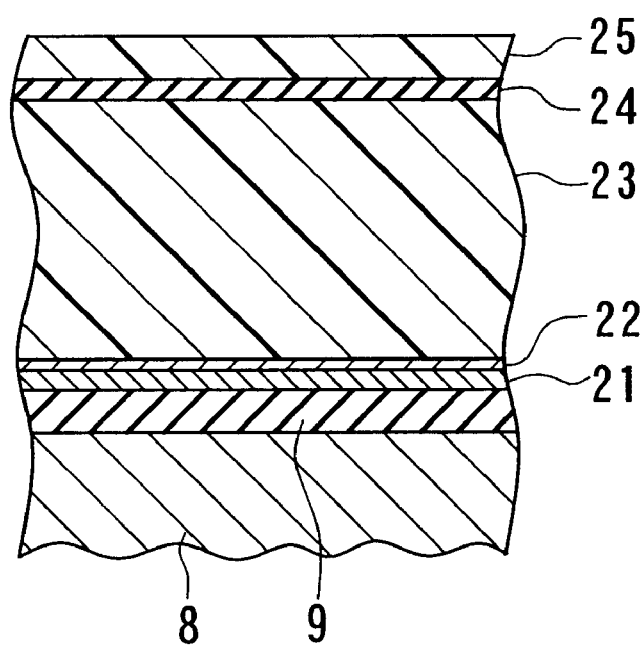
FIG. 8 is a cross section for illustrating a step that follows FIG. 7.

Next, as shown in FIG. 8, on the second layer 22 of the base film, a first photoresist layer 23, an intermediate layer 24 and a second photoresist layer 25 are formed in this order and stacked. The intermediate layer 24 is made of metal, metal oxide, ceramic, etc. The first photoresist layer 23 preferably has a thickness of 2 to 7 $\mu$m. The intermediate layer 24 preferably has a thickness of 50 to 500 nm. The second photoresist layer 25 preferably has a thickness of 0.2 to 1 $\mu$m.

Figure 9:
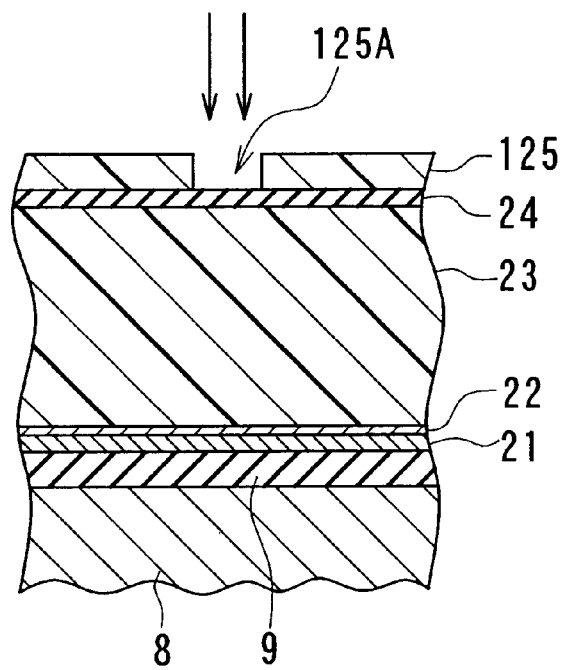
FIG. 9 is a cross section for illustrating a step that follows FIG. 8.

Next, as shown in FIG. 9, the second photoresist layer 25 is patterned by photolithography to form a patterned resist 125 having an opening 125A of a shape matching with the track width defining layer 12a.

Figure 10:
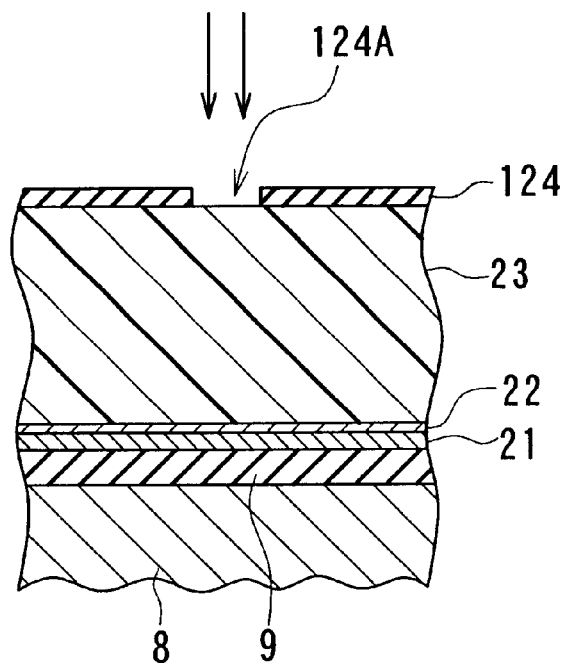
FIG. 10 is a cross section for illustrating a step that follows FIG. 9.

Next, the intermediate layer 24 is patterned by reactive ion etching using the patterned resist 125 as a mask, whereby a patterned mask 124 having an opening 124A of a shape matching with the track width defining layer 12a is formed as shown in FIG. 10. Examples of a reactive gas used in the reactive ion etching performed herein are an oxygen-based gas including $O_2$, a chlorine-based gas such as $Cl_2$ and $BCl_3$, a fluorine-based gas such as $CF_4$ and $SF_6$, etc. Arrows in FIGS. 9 through 11 indicate a direction of etching.

Figure 11:
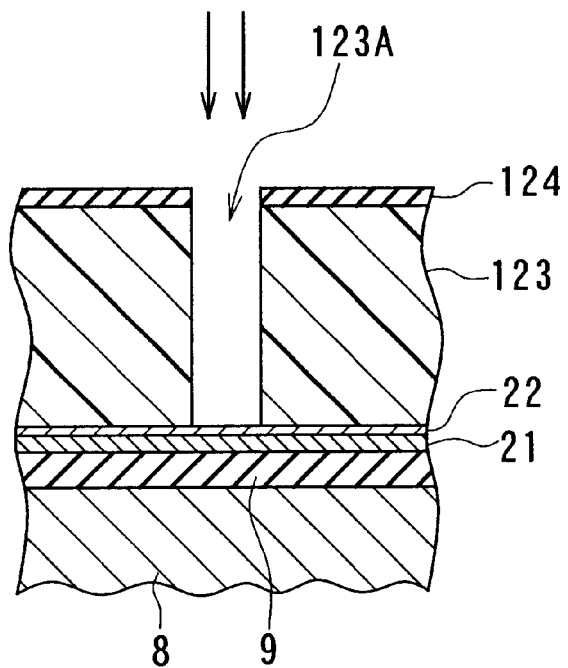
FIG. 11 is a cross section for illustrating a step that follows FIG. 10.

Next, the first photoresist layer 23 is patterned by reactive ion etching, using the patterned mask 124 as a mask, whereby a frame 123 having an opening 123A of a shape matching with the track width defining layer 12a is formed as shown in FIG. 11. Examples of a reactive gas used in the reactive ion etching performed herein are the foregoing oxygen-based gas, chlorine-based gas, fluorine-based gas, etc.

Figure 12:
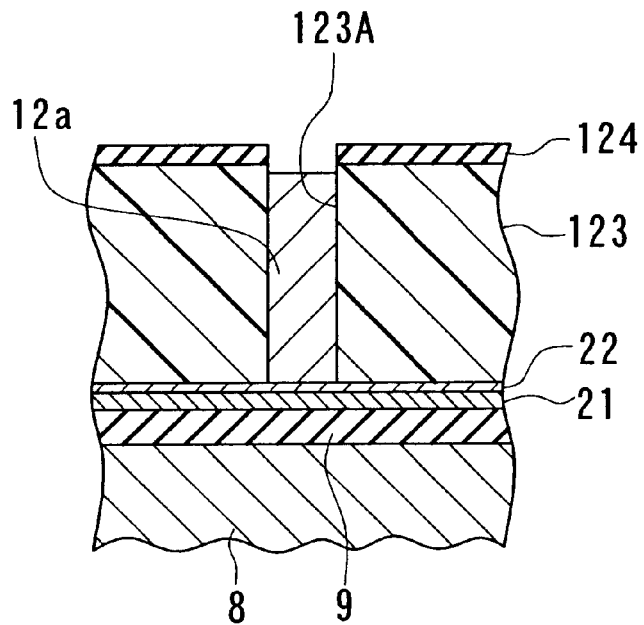
FIG. 12 is a cross section for illustrating a step that follows FIG. 11.

Next, as shown in FIG. 12, electroplating is performed by using the base films 21 and 22 as electrodes, whereby the track width defining layer 12a is formed within the opening 123A of the frame 123.

Figure 13:
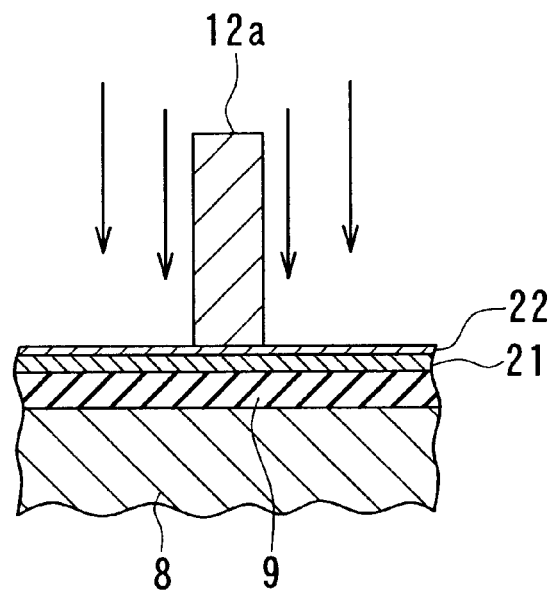
FIG. 13 is a cross section for illustrating a step that follows FIG. 12.
Figure 14:
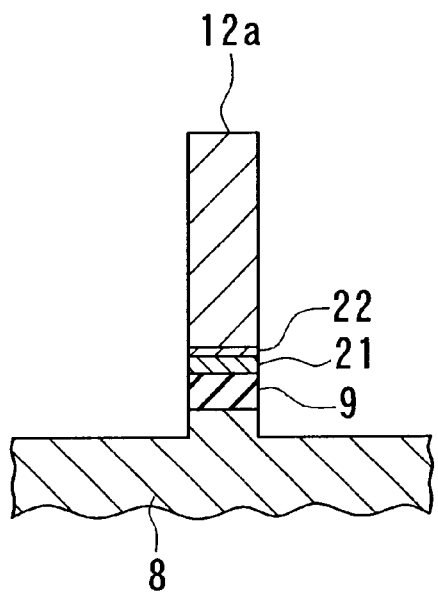
FIG. 14 is a cross section for illustrating a step that follows FIG. 13.

Next, as shown in FIG. 13, the frame 123 is removed. Subsequently, as shown in FIGS. 13 and 14, unwanted portions of the base films 21 and 22 that are other than the portions present under the track width defining layer 12a are removed by dry etching such as ion milling. Arrows in FIG. 13 indicate a direction of etching.

Next, as shown in FIG. 14, the write gap layer 9 and at least a part of the magnetic pole portion of the bottom pole layer 8 located on the side of the write gap layer 9 is etched by using the track width defining layer 12a as a mask. For example, reactive ion etching is used to etch the write gap layer 9, and ion milling is used to etch the bottom pole layer 8. In this manner, a trim structure shown in FIG. 14 is obtained.

The thin-film magnetic head having the track width defining layer 12a thus formed includes the conductive base film that is used when forming the track width defining layer 12a by plating and is to be the base of the track width defining layer 12a. The base film includes the first layer 21 made of a magnetic material having a saturation magnetic flux density of 1.8 T or more, and the second layer 22 provided between the first layer 21 and the track width defining layer 12a and made of a magnetic material different from the material of the first layer 21.

The following will describe the results of an experiment performed in comparison between the magnetic materials used for the first and second layers 21 and 22 of the base film with regard to resistance to corrosion by a plating liquid. According to this experiment, Ag/AgCl was used as a reference electrode, and an electrode potential of each material listed in a table below was measured in hydrochloric acid having activity of 1. A comparative electrode HS-205C (Trade Name) manufactured by DKK-TOA CORPORATION was used as the reference electrode. Also, in this experiment, an occurrence of corrosion (etching) in a plating liquid having a pH of 2 to 4 was checked for each material listed in the table below. Of the materials listed in the table below, CoNiFe, FeN, and FeCoTaO are magnetic materials used for the first layer 21 of the base film, and NiFe (80:20) and NiFe (50:50) are magnetic materials used for the second layer 22 of the base film. Here, NiFe (80:20) represents NiFe (Ni: 80 wt %, Fe: 20 wt %), and NiFe (50:50) represents NiFe (Ni: 50 wt %, Fe: 50 wt %). The results of this experiment are shown in the table below.

TABLE 1

| Material | Saturation magnetic flux density (T) | Electrode potential | Occurrence of corrosion |
|---|---|---|---|
| NiFe (80:20) | 0.9 | −180 | No |
| NiFe (50:50) | 1.5 | −170 | No |
| CoNiFe | 1.8 | −210 | Yes |
| FeN | 2.0 | −400 | Yes |
| FeCoTaO | 2.1 | −310 | Yes |

According to this experiment, although the frequency was low, occurrences of corrosion in the plating liquid were found for CoNiFe having an electrode potential of −210 mV. Occurrences of corrosion in the plating liquid were found at a high frequency for FeN having an electrode potential of −400 mV and FeCoTaO having an electrode potential of −310 mV. On the other hand, no corrosion in the plating liquid occurred for NiFe (80:20) having an electrode potential of −180 mV and NiFe (50:50) having an electrode potential of −170 mV. In view of the foregoing, it is assumed that corrosion in a plating liquid readily occurs for a material having an electrode potential of about −200 mV or below, and corrosion in a plating liquid hardly occurs for a material having an electrode potential exceeding about −200 mV.

Therefore, when a material having an electrode potential of −200 mV or below is used for the first layer 21 of the base film, it is possible to prevent the base film from being subject to corrosion by a plating liquid if the first layer 21 is covered with the second layer 22 made of a material having an electrode potential exceeding −200 mV.

Next, the following will describe the results of an experiment performed in comparison between the magnetic materials used for the first and second layers 21 and 22 of the base film with regard to resistance to corrosion by a reactive gas used in reactive ion etching.

In this experiment, on the assumption that an $O_2$ gas was used as the reactive gas used in reactive ion etching, occurrences of oxidation or corrosion by $O_2$ plasma were checked for each material listed in a table below. Of the materials listed in the table below, CoNiFe, FeCoTaO, FeCo, FeN, and FeAlN are magnetic materials used for the first layer 21 of the base film, and NiFe (80:20) and NiFe (50:50) are magnetic materials used for the second layer 22 of the base film. The results of this experiment are shown in the table below.

TABLE 2

| Material | Occurrence of oxidation or corrosion |
|---|---|
| NiFe (80:20) | No |
| NiFe (50:50) | No |
| CoNiFe | No (with a potential for future corrosion) |
| FeCoTaO | No (with a potential for future corrosion) |
| FeCo | Yes |
| FeN | Yes |
| FeAlN | Yes |

According to this experiment, neither oxidation nor corrosion by $O_2$ plasma occurred for NiFe (80:20) and NiFe (50:50). On the other hand, oxidation or corrosion by $O_2$ plasma occurred for FeCo, FeN, and FeAlN. Neither oxidation nor corrosion by $O_2$ plasma occurred for CoNiFe and FeCoTaO. However, as can be understood from the results of the experiment of comparison in resistance to corrosion by a plating liquid, even if no corrosion may occur for CoNiFe and FeCoTaO during the step of reactive ion etching, there is a possibility that corrosion may occur in later steps.

Therefore, when CoNiFe, FeCoTaO, FeCo, FeN, or FeAlN is used for the first layer 21 of the base film, it is possible to prevent the base film from being subject to corrosion by a reactive gas during reactive ion etching if the first layer 21 is covered with the second layer 22 made of a magnetic material such as NiFe (80:20) or NiFe (50:50), for which neither oxidation nor corrosion by a reactive gas occurs.

Next, functions and advantages of the thin-film magnetic head and the method of manufacturing the same according to the present embodiment will be described.

Initially, with reference to FIGS. 15 and 16, problems in the case of forming a frame on the base film made of a high saturation magnetic flux density material containing Co will be described for comparison with the present embodiment.

Figure 15:
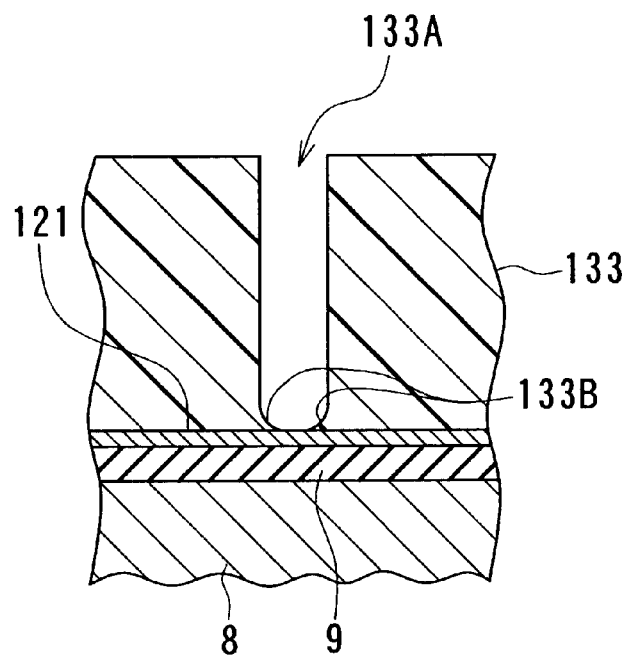
FIG. 15 is a cross section showing a state where a part of photoresist remains on a base film within an opening of a frame.

FIG. 15 shows a state where a base film 121 is formed from a high saturation magnetic flux density material containing Co on the write gap layer 9; a photoresist layer is then formed on the base film 121; the photoresist layer is then patterned by photolithography; and a frame 133 having an opening 133A is thereby formed. When the frame 133 is formed on the base film 121 made of a high saturation magnetic flux density material containing Co, a part of the photoresist that should be removed often adheres to the base film 121 and remains thereon within the opening 133A of the frame 133. In FIG. 15, reference numeral 133B denotes a residual portion of the photoresist.

Figure 16:
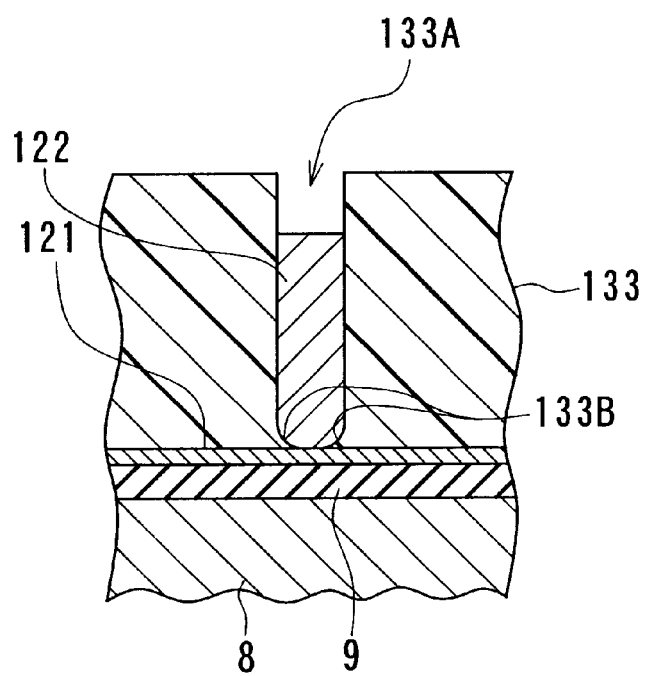
FIG. 16 is a cross section showing the frame of FIG. 15 and a plating layer formed by using the frame.

FIG. 16 is a cross section showing the frame 133 of FIG. 15 and a magnetic pole 122 that is a plating layer formed by using the frame 133. As is shown in FIG. 16, when a part of the photoresist that should be removed remains on the base film 121 within the opening 133A of the frame 133, the pole 122 cannot be formed into a desired shape.

On the contrary, according to the present embodiment, the base film used in forming the track width defining layer 12a by plating includes the first layer 21 made of a high saturation magnetic flux density material having a saturation magnetic flux density of 1.8 T or more, and the second layer 22 formed on the first layer 21. Therefore, the first layer 21 is covered with the second layer 22 and is not brought into contact with the photoresist. The second layer 22 that is in contact with the photoresist is made of a magnetic material containing Fe or Ni as a main component and not containing Co. Such a magnetic material has good peeling property with respect to photoresist, as compared with the high saturation magnetic flux density material used for the first layer 21. Therefore, according to the present embodiment, it is possible to prevent an unwanted part of the photoresist from remaining on the base film, and as a result, it possible to form the magnetic pole (track width defining layer 12a) into a desired shape.

As shown in FIG. 15, another problem in the case of forming the frame 133 on the base film 121 made of a high saturation magnetic flux density material containing Co is that the base film 121 is damaged by corrosion as it is etched away by a plating liquid or a reactive gas used in reactive ion etching.

On the contrary, according to the present embodiment, the second layer 22 of the base film is made of a magnetic material that has better resistance to corrosion by a plating liquid used in forming the track width defining layer 12a by plating than that of the magnetic material forming the first layer 21. Furthermore, the magnetic material forming the second layer 22 of the base film has better resistance to corrosion by a reactive gas used in patterning the frame used in forming the track width defining layer 12a by reactive ion etching than that of the magnetic material forming the first layer 21. Therefore, according to the present embodiment, it is possible to prevent the base film from being etched away and damaged by corrosion by a plating liquid or a reactive gas, which makes it possible to form the magnetic pole (track width defining layer 12a) into a desired shape.

Also, according to the present embodiment, the first layer 21 of the base film is made of a high saturation magnetic flux density material having a saturation magnetic flux density of 1.8 T or more, while the second layer 22 of the base film is made of a magnetic material. It is therefore possible to prevent deterioration of the recording characteristics even when the pole width is reduced, thereby meeting the demand for a high recording density.

As has been discussed, according to the present embodiment, it is possible to form a magnetic pole into a desired shape, while using a high saturation magnetic flux density material as the material of the base film so as to meet the demand for a high recording density. Consequently, according to the present embodiment it is possible to mass-produce thin-film magnetic heads that meet the demand for a high recording density at a high yield.

Figure 17:
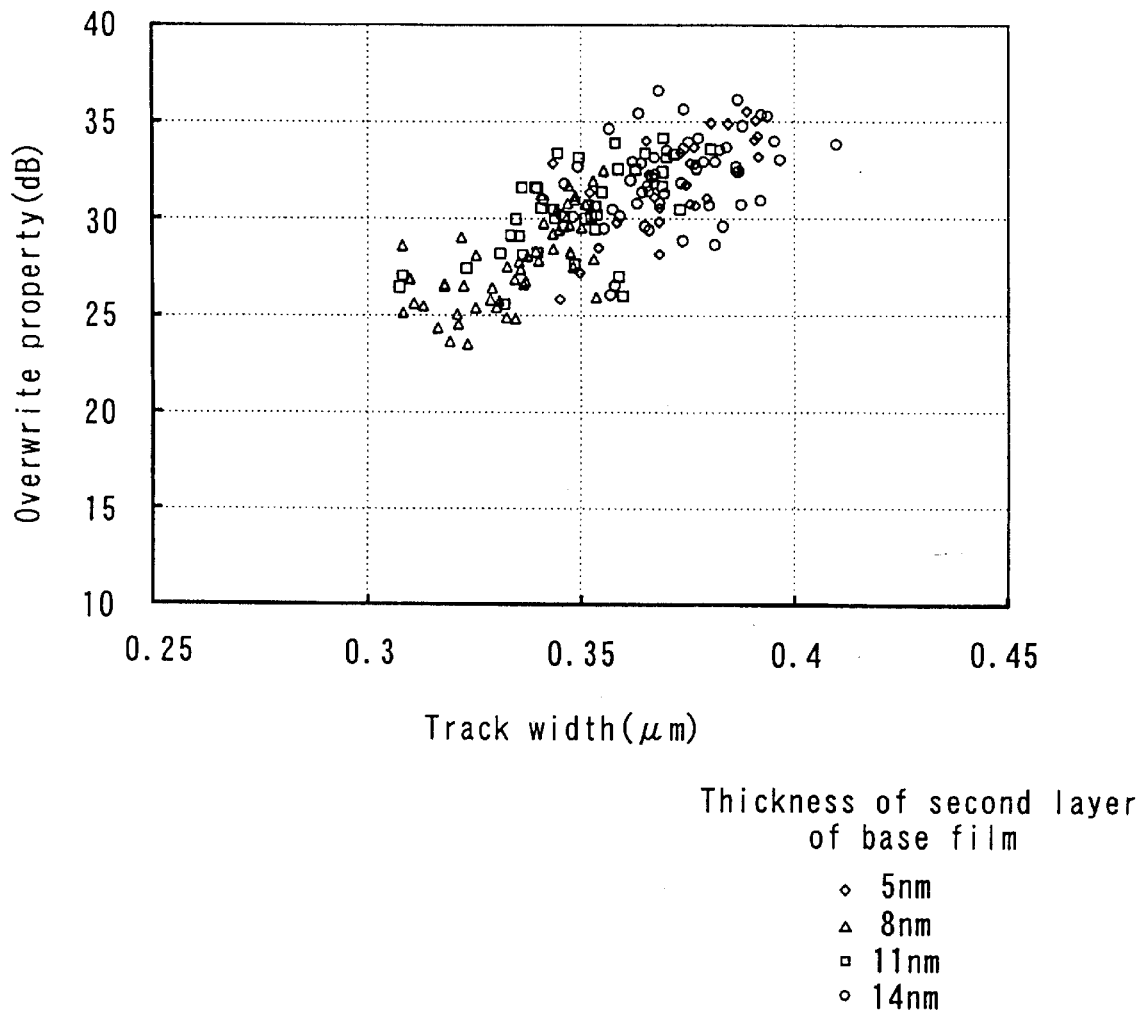
FIG. 17 is a characteristics diagram showing a relation among a thickness of a second layer of the base film, a write track width of the thin-film magnetic head, and overwrite property of the thin-film magnetic head in the embodiment of the invention.

Next, a preferable range of the thickness of the second layer 22 of the base film will be described with reference to FIG. 17. FIG. 17 shows the results of measurements of write track widths and overwrite properties for a number of prototypes of thin-film magnetic head prepared under the conditions specified below. In the prototypes of thin-film magnetic head prepared herein, the base film comprised the bonding layer made of a 5-nm-thick Ta layer, the first layer 21 made of a 50-nm-thick CoNiFe layer, and the second layer 22 made of an NiFe layer. The second layer 22 was formed to have six different thicknesses of 5 nm, 8 nm, 11 nm, 14 nm, 20 nm, and 50 nm. However, FIG. 17 shows the results for only the prototypes with the second layers 22 having the thicknesses of 5 nm, 8 nm, 11 nm, and 14 nm. With regard to those with the second layer 22 having the thicknesses of 20 nm and 50 nm, values of the standardized overwrite property will be shown later. Also, each of the prototypes of thin-film magnetic head was provided with the track width defining layer 12a made up of a 1-µm-thick CoNiFe layer formed on the second layer 22, and a 1.5-µm-thick NiFe (Ni: 80 wt %, Fe: 20 wt %) layer formed on the CoNiFe layer.

From the measurement results shown in FIG. 17, a liner equation representing a relation between the track width and the overwrite property was found by the least-square method for each thickness of the second layer 22. Then, by using the liner equation thus found, values of the overwrite property when the track width 0.35 µm were obtained as values of the standardized overwrite property. The values of the standardized overwrite property are shown in the following table.

TABLE 3

| Thickness of the second layer of the base film (nm) | Overwrite property (dB) |
|---|---|
| 5 | 29.7 |
| 8 | 29.5 |
| 11 | 30.5 |
| 14 | 30.7 |
| 20 | 28.4 |
| 50 | 27.5 |

It is desirable that the overwrite property is 30 dB or higher. The above table reveals that, when the track width is 0.35 µm, overwrite property of approximately 30 dB or higher can be attained if the thickness of the second layer 22 of the base film is 14 nm or less. Accordingly, in order to prevent deterioration of the recording characteristics by the second layer 22, it is referable that the second layer 22 has a thickness of 14 nm or less. Also, because the overwrite property improves as the track width increases, even when the track width is wider than 0.35 µm, it is possible to achieve satisfactory overwrite property if the thickness of the second layer 22 is 14 nm or less.

In addition, it was found that the second layer 22 of the it has a thickness of 8 nm or larger, can sufficiently exert the advantageous effects of preventing an unwanted residual photoresist and preventing the base film from being subject to corrosion. In view of the foregoing, it is preferable that the second layer 22 has a thickness of 8 to 14 nm.

Figure 18:
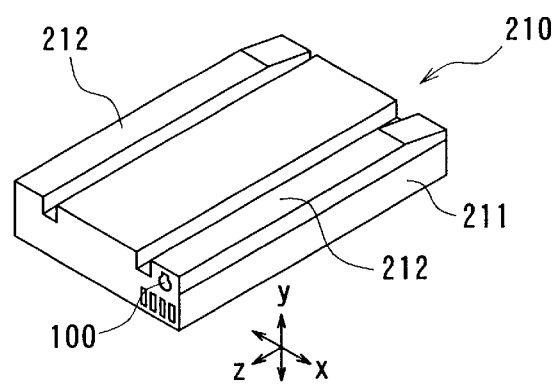
FIG. 18 is a perspective view illustrating a slider incorporated in a head gimbal assembly of the embodiment of the invention.

A head gimbal assembly and a hard disk drive of the present embodiment will now be described. Initially, with reference to FIG. 18, a slider 210 incorporated in the head gimbal assembly is described. In the hard disk drive, the slider 210 is placed to face toward a hard disk platter that is a circular-plate-shaped recording medium to be rotated and driven. The slider 210 has a base body 211 made up mainly of the substrate 1 and the overcoat layer 17 of FIGS. 6A and 6B. The base body 211 is nearly hexahedron-shaped. One of the six surfaces of the base body 211 faces toward the hard disk platter. Rails 212 are formed in this one of the surfaces. A surface of each of the rails 212 functions as the air bearing surface. A tapered portion or a stepped portion is formed near the air-inflow-side end (the end located at the upper right of FIG. 18) of each of the rails 212. When the hard disk platter rotates in the z direction of FIG. 18, an airflow goes into the tapered portion or stepped portion and passes between the hard disk platter and the slider 210. A lift is thus created below the slider 210 in they direction of FIG. 18 by the airflow and is exerted on the slider 210. The slider 210 floats over the hard disk platter by means of the lift. The x direction of FIG. 18 is across the track of the hard disk platter. A thin-film magnetic head 100 of the present embodiment is formed near the air-outflow-side end (the end located at the lower left of FIG. 18) of the slider 210.

Figure 19:
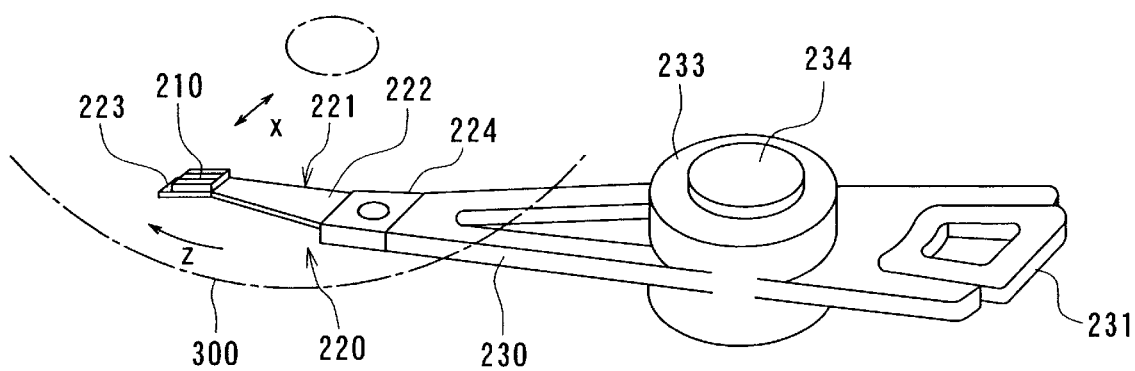
FIG. 19 is a perspective view showing a head arm assembly including the head gimbal assembly of the embodiment of the invention.

Reference is now made to FIG. 19 to describe the head gimbal assembly 220 of the embodiment. The head gimbal assembly 220 comprises the slider 210 and a suspension 221 that flexibly supports the slider 210. The suspension 221 incorporates: a plate-spring-shaped load beam 222 made of stainless steel, for example; a flexure 223 to which the slider 210 is joined, the flexure being located at an end of the load beam 222 and giving an appropriate degree of freedom to the slider 210; and a base plate 224 located at the other end of the load beam 222. The base plate 224 is attached to an arm 230 of an actuator that moves the slider 210 along the x direction across the track of the hard disk platter 300. The actuator incorporates the arm 230 and a voice coil motor that drives the arm 230. A gimbal section that maintains the orientation of the slider 210 is provided in the portion of the flexure 223 on which the slider 210 is mounted.

The head gimbal assembly 220 is attached to the arm 230 of the actuator. The head gimbal assembly 220 attached to the single arm 230 is called a head arm assembly. A plurality of head gimbal assemblies 220 each attached to a plurality of arms of a carriage are called a head stack assembly.

FIG. 19 illustrates an example of the head arm assembly. In the head arm assembly the head gimbal assembly 220 is attached to an end of the arm 230. A coil 231 that is part of the voice coil motor is fixed to the other end of the arm 230. A bearing 233 is provided in the middle of the arm 230. The bearing 233 is attached to an axis 234 that rotatably supports the arm 230.

Figure 20:
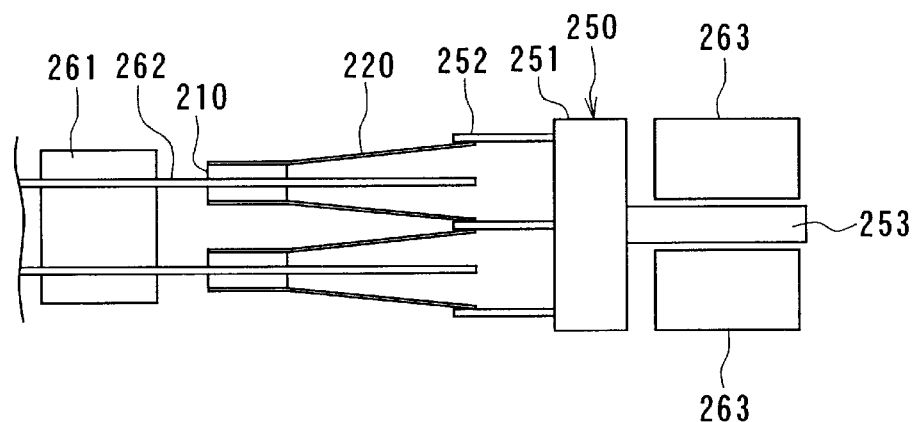
FIG. 20 illustrates a main part of a hard disk drive of the embodiment of the invention.
Figure 21:
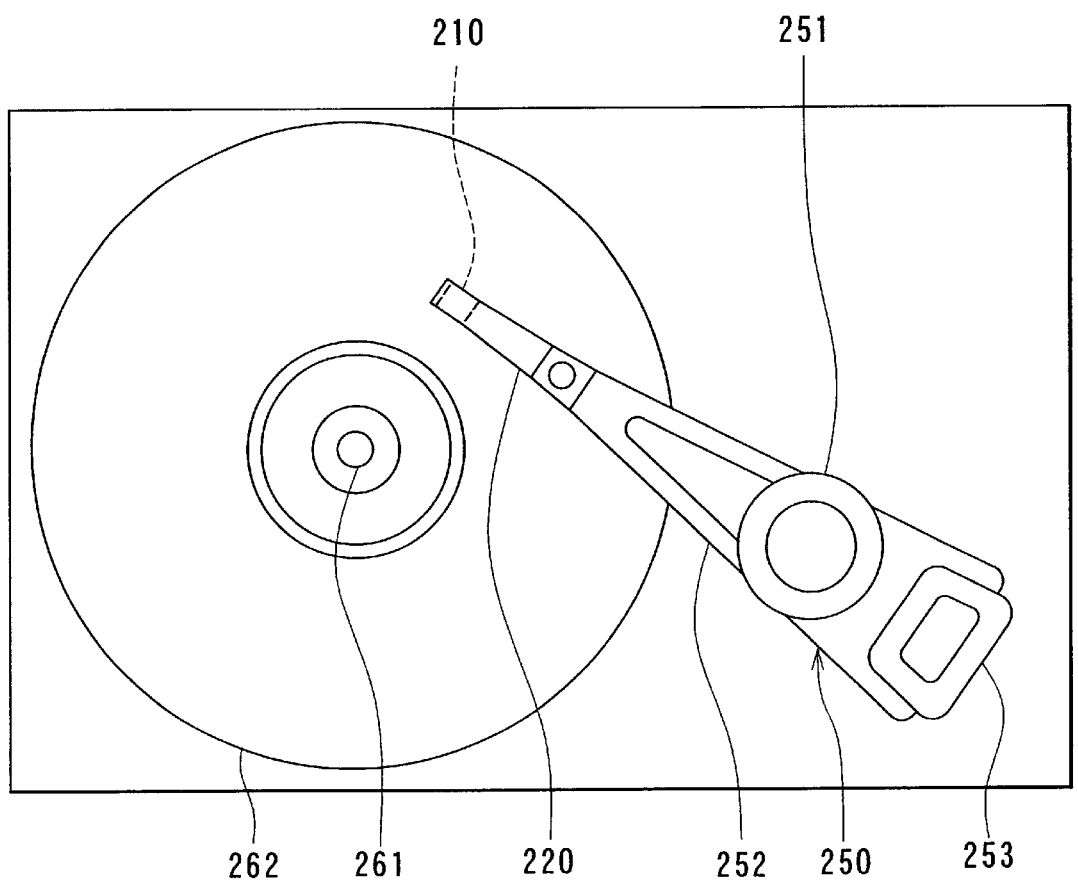
FIG. 21 is a top view of the hard disk drive of the embodiment of the invention.

Reference is now made to FIGS. 20 and 21 to describe an example of the head stack assembly and the hard disk drive of the embodiment. FIG. 20 illustrates the main part of the hard disk drive. FIG. 21 is a top view of the hard disk drive. The head stack assembly 250 incorporates a carriage 251 having a plurality of arms 252. A plurality of head gimbal assemblies 220 are each attached to the arms 252 such that the assemblies 220 are arranged in the vertical direction with spacing between adjacent ones. A coil 253 that is part of the voice coil motor is mounted on the carriage 251 on a side opposite to the arms 252. The head stack assembly 250 is installed in the hard disk drive. The hard disk drive includes a plurality of hard disk platters 262 mounted on a spindle motor 261. Two of the sliders 210 are allocated to each of the platters 262, such that the two sliders 210 face each other with each of the platters 262 in between. The voice coil motor includes permanent magnets 263 located to face each other, the coil 253 of the head stack assembly 250 being placed between the magnets 263.

The head stack assembly 250 except the slider 210 and the actuator correspond to the alignment device of the invention and support the slider 210 and align it with respect to the hard disk platter 262.

In the hard disk drive of the embodiment the actuator moves the slider 210 across the track of the hard disk platter 262 and aligns the slider 210 with respect to the platter 262. The thin-film magnetic head incorporated in the slider 210 writes data on the platter 262 through the use of the write head and reads data stored on the platter 262 through the use of the read head.

The head gimbal assembly and the hard disk drive of the embodiment exhibit the effects similar to those of the foregoing thin-film magnetic head of the embodiment.

It should be noted that the present invention is not limited to the above embodiment but may be modified in various manners. In the foregoing embodiment, for example, the frame for plating is formed from a multi-layer film having three or more layers. However, the present invention is applicable to a case where the frame is formed by patterning a single-layer photoresist.

Also, in the foregoing embodiment, the top pole layer 12 including the magnetic pole portion that defines the write track width is made up of the track width defining layer 12a, the coupling portion layer 12b, and the yoke portion layer 12c. However, the present invention is applicable to a case where the top pole layer 12 is made up of a single layer. In this case, the single layer making up the top pole layer 12 functions as the layer including the magnetic pole portion of the present invention.

In addition, the foregoing embodiment discloses the thin-film magnetic head comprising the MR element for reading formed on the base body and the induction-type electromagnetic transducer for writing stacked on the MR element. However, the order of stacking can be reversed.

That is, the induction-type electromagnetic transducer for writing may be formed on the base body and the MR element for reading may be stacked on the transducer. Such a structure may be achieved by forming a magnetic film functioning as the top pole layer of the foregoing embodiment as a bottom pole layer on the base body, and forming a magnetic film functioning as the bottom pole layer of the embodiment as a top pole layer facing toward the bottom pole layer with a write gap film in between.

In addition, the present invention is applicable to a thin-film magnetic head dedicated to writing that has an induction-type electromagnetic transducer only or to a thin-film magnetic head performing writing and reading through an induction-type electromagnetic transducer.

As has been discussed, according to the thin-film magnetic head and the method of manufacturing same, the head gimbal assembly, or the hard disk drive of the present invention, the first layer of the base film made of a high saturation magnetic flux density material having a saturation magnetic flux density of 1.8 T or more is covered with the second layer made of a magnetic material, so that the first layer is neither brought into contact with the resist nor susceptible to etching by a plating liquid or a reactive gas. Therefore, according to the present invention, by selecting a material having good peeling property with respect to the resist or high resistance to corrosion by a plating liquid or a reactive gas as the magnetic material of the second layer, it is possible to form a magnetic pole into a desired shape, while using a high saturation magnetic flux density material as the material of the base film that is to be a base of the magnetic pole formed by frame plating so as to meet the demand for a high recording density.

Also, in the thin-film magnetic head or the method of manufacturing same of the invention, the second layer may be made of a magnetic material that contains Fe or Ni as a main component and does not contain Co. In this case, in particular, it is possible to attain good peeling property of the second layer with respect to the resist, and to prevent an unwanted part of the resist from adhering to the base film and remaining thereon.

In addition, in the thin-film magnetic head or the method of manufacturing same of the invention, the magnetic material of which the second layer is made may have better resistance to corrosion by a plating liquid used in forming the layer including the magnetic pole portion by plating than that of the magnetic material of which the first layer is made. In this case, in particular, it is possible to prevent the base film from being subject to corrosion by a plating liquid.

Further, in the thin-film magnetic head or the method of manufacturing same of the invention, the magnetic material of which the second layer is made may have better resistance to corrosion by a reactive gas used in pattering the frame used in forming the layer including the magnetic pole portion by reactive ion etching than that of the magnetic material of which the first layer is made. In this case, in particular, it is possible to prevent the base film from being subject to corrosion by a reactive gas.

Furthermore, in the thin-film magnetic head or the method of manufacturing same of the invention, the second layer may have a thickness of 14 nm or less. In this case, it is possible to prevent deterioration of the recording characteristics by the second layer.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising:
    a medium facing surface that faces toward a recording medium;
    a first magnetic layer and a second magnetic layer magnetically coupled to each other and including magnetic pole portions that are opposed to each other and placed in regions of the magnetic layers on a side of the medium facing surface, each of the magnetic layers including at least one layer;
    a gap layer provided between the magnetic pole portions of the first and second magnetic layers; and
    a thin-film coil at least a part of which is placed between the first and second magnetic layers and insulated from the first and second magnetic layers, wherein:
    at least one of the first and second magnetic layers includes a conductive base film and a layer including the magnetic pole portion; and
    the base film includes a first layer made of a magnetic material having a saturation magnetic flux density of 1.8 T or more, and a second layer provided between the first layer and the layer including the magnetic pole portion and made of a magnetic material different from the material of the first layer.

2. A thin-film magnetic head according to claim 1, wherein the magnetic material of which the second layer is made is a magnetic material that contains Fe or Ni as a main component and does not contain Co.

3. A thin-film magnetic head according to claim 1, wherein the magnetic material of which the second layer is made has better resistance to corrosion by a plating liquid used in forming the layer including the magnetic pole portion by plating than that of the magnetic material of which the first layer is made.

4. A thin-film magnetic head according to claim 1, wherein the magnetic material of which the second layer is made has better resistance to corrosion by a reactive gas used in patterning a frame for forming the layer including the magnetic pole portion by reactive ion etching than that of the magnetic material of which the first layer is made.

5. A thin-film magnetic head according to claim 1, wherein the second layer has a thickness of 14 nm or less.

6. A thin-film magnetic head according to claim 1, wherein the magnetic material of which the first layer is made is a magnetic material containing Co.

7. A head gimbal assembly comprising a slider that includes a thin-film magnetic head and is located to face toward a recording medium, and a suspension that flexibly supports the slider, the thin-film magnetic head comprising:
    a medium facing surface that faces toward a recording medium;
    a first magnetic layer and a second magnetic layer magnetically coupled to each other and including magnetic pole portions that are opposed to each other and placed in regions of the magnetic layers on a side of the medium facing surface, each of the magnetic layers including at least one layer;
    a gap layer provided between the magnetic pole portions of the first and second magnetic layers; and
    a thin-film coil at least a part of which is placed between the first and second magnetic layers and insulated from the first and second magnetic layers, wherein:
    at least one of the first and second magnetic layers includes a conductive base film and a layer including the magnetic pole portion; and
    the base film includes a first layer made of a magnetic material having a saturation magnetic flux density of 1.8 T or more, and a second layer provided between the first layer and the layer including the magnetic pole portion and made of a magnetic material different from the material of the first layer.

8. A hard disk drive comprising a slider that includes a thin-film magnetic head and is located to face toward a circular-plate-shaped recording medium that is rotated and driven, and an alignment device that supports the slider and aligns the slider with respect to the medium, the thin-film magnetic head comprising:
    a medium facing surface that faces toward a recording medium;
    a first magnetic layer and a second magnetic layer magnetically coupled to each other and including magnetic pole portions that are opposed to each other and placed in regions of the magnetic layers on a side of the medium facing surface, each of the magnetic layers including at least one layer;

a gap layer provided between the magnetic pole portions of the first and second magnetic layers; and a thin-film coil at least a part of which is placed between the first and second magnetic layers and insulated from the first and second magnetic layers, wherein:

at least one of the first and second magnetic layers includes a conductive base film and a layer including the magnetic pole portion; and the base film includes a first layer made of a magnetic material having a saturation magnetic flux density of 1.8 T or more, and a second layer provided between the first layer and the layer including the magnetic pole portion and made of a magnetic material different from the material of the first layer.

* * * * *

UNITED STATES PATENT AND TRADEMARK OFFICE
CERTIFICATE OF CORRECTION

PATENT NO. : 6,654,203 B2
DATED : November 25, 2003
INVENTOR(S) : Seiji Yari et al.

It is certified that error appears in the above-identified patent and that said Letters Patent is hereby corrected as shown below:

Column 8,
Line 58, replace "la" with -- 10a --.

Column 14,
Line 39, after "width" insert -- was --.
Line 66, after "of the" insert -- base film, when --.

Column 15,
Line 23, replace "they" with -- the y --.

Signed and Sealed this

Third Day of February, 2004

JON W. DUDAS
*Acting Director of the United States Patent and Trademark Office*